United States Patent [19]

Bevilacqua

[11] 4,169,760
[45] Oct. 2, 1979

[54] NUCLEAR REACTOR WITH SCRAMMABLE PART LENGTH ROD

[75] Inventor: Frank Bevilacqua, Windsor, Conn.

[73] Assignee: Combustion Engineering Inc., Windsor, Conn.

[21] Appl. No.: 758,125

[22] Filed: Jan. 10, 1977

Related U.S. Application Data

[62] Division of Ser. No. 604,529, Aug. 14, 1975, abandoned.

[51] Int. Cl.² ............................................. G21C 7/08
[52] U.S. Cl. ................................. 176/36 R; 176/86 R
[58] Field of Search ................... 176/22, 36 R, 33–35, 176/86 R

[56] References Cited

U.S. PATENT DOCUMENTS

| | | | |
|---|---|---|---|
| 2,952,600 | 9/1960 | Newson | 176/86 R |
| 3,042,598 | 7/1962 | Crowther | 176/93 BP |
| 3,081,248 | 3/1963 | Grant | 176/36 R |
| 3,255,086 | 6/1966 | Hitchcock | 176/86 R |
| 3,267,002 | 8/1966 | Fromm, Jr. et al. | 176/86 R |
| 3,519,535 | 7/1970 | French et al. | 176/35 |
| 3,551,289 | 12/1970 | Eich et al. | 176/36 |
| 3,595,748 | 7/1971 | Frisch et al. | 176/36 |
| 3,607,629 | 9/1971 | Frisch et al. | 176/36 |
| 3,625,816 | 12/1971 | Aleite et al. | 176/86 |
| 3,734,825 | 5/1973 | Schabert et al. | 176/36 |
| 3,773,617 | 11/1973 | Marmonier et al. | 176/86 R |

OTHER PUBLICATIONS

Schultz, "Control of Nuclear Reactors and Power Plants", 1955, pp. 98, 99, 100, 101, 113.

Primary Examiner—Harvey E. Behrend
Attorney, Agent, or Firm—Stephen L. Borst

[57] ABSTRACT

A new part length rod is provided which may be used to not only control xenon induced power oscillations but also to contribute to shutdown reactivity when a rapid shutdown of the reactor is required. The part length rod consists of a control rod with three regions. The lower control region is a longer weaker active portion separated from an upper stronger shorter poison section by an intermediate section which is a relative non-absorber of neutrons. The combination of the longer weaker control section with the upper high worth poison section permits the part length rod of this invention to be scrammed into the core. When a reactor shutdown is required but also permits the control rod to be used as a tool to control power distribution in both the axial and radial directions during normal operation.

3 Claims, 1 Drawing Figure

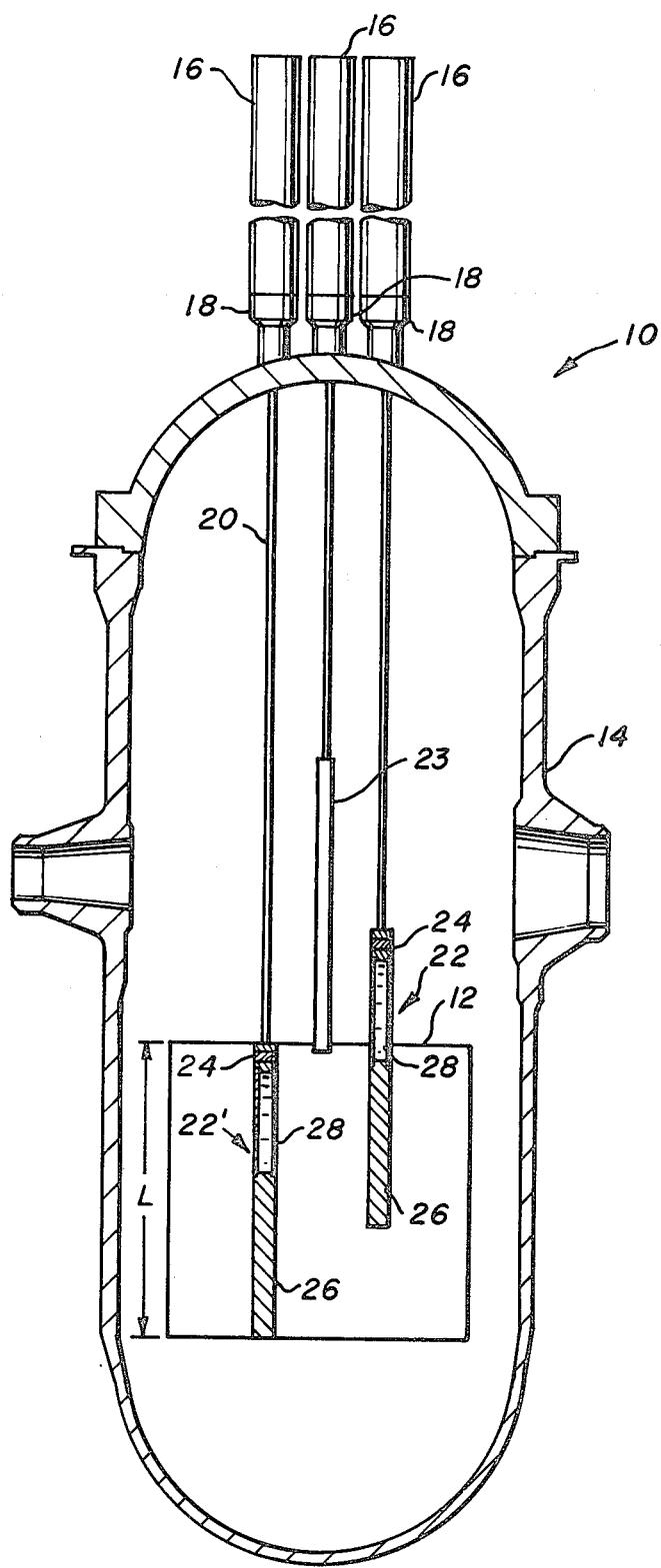

NUCLEAR REACTOR WITH SCRAMMABLE PART LENGTH ROD

This is a division, of application Ser. No. 604,529, filed Aug. 14, 1975, now abandoned, the benefit of the filing date of which is hereby claimed.

BACKGROUND OF THE INVENTION

This invention pertains to control rods for the control of nuclear reactors and more particularly to a part length rod useful for controlling power oscillations and for contributing to reactor shutdown.

DESCRIPTION OF THE PRIOR ART

It is well understood in the art of nuclear reactor power generation that larger reactors exhibit unstable oscillatory distortion of the nuetron flux in the axial direction. These power oscillations occur as a result of local increases in the neutron flux leading to the "burn-out" of xenon 135 (produced by radioactive decay of iodine 135) which increases reactivity, and leads to a further flux distortion and so on. In the course of time the concentration of xenon 135 begins to build up because of the higer flux level, and the whole process is reversed.

Various attempts have been made by the prior art to provide specially designed control rods for the purpose of controlling such xenon produced power oscillations. One such earlier attempt is illustrated in U.S. Pat. No. 3,081,248 issued to P. J. Grant on Mar. 12, 1963.

This attempted solution to the control problem proposed the provision of a control rod or control means comprising a pair of neutron absorber members adapted to be inserted into different parts of the reactor core and linked or coupled whereby movement of one member into, or out of, the reactor core was accompanied by a corresponding movement of the other member out of, or into, the reactor core, the arrangement being such that by the differential movement of the two members, the fluxes in the two parts of the reactor core are relatively adjusted without substantially effecting the total flux. This solution, however, was fraught with difficulties which rendered the solution generally unacceptable to the power industry. One of the difficulties was that the special control rod had a length in excess of the length of the active portion of the reactor which necessarily tended to increase the length of the pressure vessel surrounding the reactor core. Unnecessary increases in pressure vessel size are extremely expensive and are avoided if at all possible. A second difficulty was that each of the special control rods had to be driven with a special control rod drive mechanism which could not be scrammed when a rapid shutdown of the reactor was required.

A second prior art solution to the control of power distribution oscillations within the core is the use of a part length control rod. Such rods are controlled indeqpendently of the main control rods and generally contain the neutron poison in the lower portion of the rod, with the upper portion of the rod being substantially non-neutron absorbing. In operation the poison portion is normally positioned in the central region of the core. If these rods are allowed to scram when a rapid shutdown of the reactor is required, the rods drop to the bottom of the reactor and the poison could be removed from a position of higher control worth to a position of lower control worth. This would tend to increase the reactivity of the reactor just at a time when every effort is being made to reduce the reactivity. Accordingly, utilization of the prior art linear motion devices for part length control rods of commercial nuclear power plants, did not result in a fail safe system. Simultaneously tripping of several part length control rods could result in an undesirable increase in the reactivity unless all the full length rods are tripped at the same time. Hence, the use of these prior art part length rods requires the use of a different type of linear motion device which is incapable of scramming the part length control rods. One such non-scrammable part length control rod drive mechanism is disclosed in U.S. Pat. No. 3,825,160 issued to Lichtenberger et al on July 23, 1974 and assigned to the present assignee.

As can be appreciated from the above discussion, the prior art solutions to the control of power oscillations required two distinct control rod drive mechanisms; a scrammable drive mechanism and a non-scrammable drive mechanism. In addition to the increased cost associated with providing two distinct types of drive mechanisms on each nuclear reactor, the prior art solutions have the effect of decreasing the control flexibility of the reactor. This follows since the positions of the part length rods and their drive mechanisms become fixed once the drive mechanisms are installed by welding on the reactor pressure vessel. Hence, the reactor designers do not have the flexibility of relocating the part length rods from these initially fixed positions without expensive and complex disassembly and relocation of the drive mechanisms.

Thus a need is felt for a part length rod which may be scrammed into the core when a rapid reactor shutdown is necessary so that additional flexibility in the positioning of the part length rod may be achieved by simply moving the part length rod from one scrammable control rod drive mechanism to another identical scrammable control rod drive mechanism.

SUMMARY OF THE INVENTION

A part length rod is provided which may be mounted on a scrammable control rod drive mechanism and which may be scrammed into the reactor core when a rapid reactor shutdown is required.

The part length control rod of this invention has first and second ends with a first neutron absorbing material at its first end, a second neutron absorbing material at its second end spaced from the first neutron absorbing material by a distance less than the length of the core, and a third intermediate portion connecting the first and second neutron absorbing materials, the intermediate material being substantially non-neutron absorbing. The first neutron absorbing material is a material of high macroscopic neutron absorption cross-section. The second neutron absorbing material has a smaller macroscopic neutron absorption cross-section than the first neutron absorbing material. The second neutron absorbing material is normally positioned in the central region of the core for control of power oscillation. The first neutron absorbing material is normally positioned outside of the reactor core where it has little or no effect on the neutron flux of the reactor core. Upon the requirement for a rapid reactor shutdown, the part length control rod is scrammed or inserted into the core so that both first and second ends of the control rod are simultaneously positioned within the core at opposite ends of the core or so that at least a fraction of each end of said first and second ends are simultaneously positioned within the core.

BRIEF DESCRIPTION OF THE DRAWING

Other advantages of the invention and a better understanding of the invention will be apparent from the following detailed description taken in consideration with the accompanying drawing, in which the FIGURE is a side elevation of a nuclear reactor pressure vessel and core showing the design and positioning of this invention's new part length rod.

DESCRIPTION OF THE PREFERRED EMBODIMENT

The part length rod design described herein is illustrated in the FIGURE. The nuclear reactor 10 generally includes nuclear reactor core 12 with length L, pressure vessel 14, control rod drive mechanisms 16 attached to nozzles 18 which penetrate the reactor pressure vessel 14 and part length rods 22 and 22' of length L connected to the control rod drive mechanisms 16 by means of connecting elements 20. The part length control rods 22, 22' of the invention have two neutron absorbing regions 24 and 26. Normal, full length control rods (an example of which shown at 23) constitute a first group of rods insertable into the core for normal control of reactor power, and the part length rods 22, 22' constitute a second group of control rods for control of power oscillations. Part length control rod 22 is shown in its normal control position approximately centrally positioned in the reactor core. Part length control rod 22' is shown in its scrammed or fully inserted position in which both poison sections 24 and 26 are positioned within the reactor core 12 at opposite ends of the core 12. Each part length control rod 22, 22' is translatable from a full out position to a full in position. As can be seen in the FIGURE, poison portions 24 and 26 are connected by an intermediate connecting portion 28. This intermediate connecting portion 28 acts as a poison section "follower". In the preferred embodiment the "follower" section 28 is a water filled inconel tube designed to achieve the minimum reactivity control worth obtainable. Hence, by use of a water filled follower, the maximum effective control worth of the lower control portion 26 is obtained.

On either part length control rod 22, 22' the first portion 24 appears at a first end of the part length rod 22, 22' and consists of a first neutron absorbing material. A second portion 26 appears at the second end of the part length rod 22, 22' and consists of a second neutron absorbing material. The second neutron absorbing material 26 preferably has a smaller macroscopic absorption cross-section than the first neutron absorbing material 24. For the purposes of this disclosure the terminology "macroscopic absorption cross-section" is defined to be the product of the number density of the particular element in question and the microscopic neutron absorption cross-section of the element in question. Accordingly, it is a desirable feature of the invention to provide the second portion 26 of the part length control rod 22, 22' with a macroscopic absorption cross-section that is smaller than the macroscopic absorption cross-section of the first portion 24 by providing a material with a high number density but with a low microscopic neutron absorption cross-section. This combination is desirable since it resists depletion of the neutron poison more readily than would a neutron poison resulting from the combination of a smaller number density but a larger microscopic neutron absorption cross-section. A well-known material in the science of nuclear reactor design which meets these requirements is the alloy Inconel 600. Inconel 600 is defined by the Standard Handbook For Mechanical Engineers by Baumeister and Marks, 7th Edition as having the following composition: (76Ni- 0.04C-0.2Mn-7.20Fe-0.2Si-0.1Cu-15.8Cr). An alternative and equally as acceptable material is Inconel 625 (61Ni-21Cr-9Mo).

In the preferred embodiment of this disclosure the second neutron absorbing material located at the second end of the part length rod is preferably between 25 and 55 percent of the length of the active region of the nuclear core. Such a part length rod made from Inconel 600 has a longer and a weaker nuetron absorbing section than has previously been known in the prior art. This longer and weaker neutron absorbing section has many advantages. One positive advantage is that the longer weaker neutron absorbing section reduces the possibility of incurring nuclear fuel failure. Although the mechanism for nuclear fuel pin clad failure through fuel interaction has not been completely established, it is generally agreed that the magnitude and rate of change of local power density in a fuel pellet are important components of the failure mechanism. Since fuel pellets in the vicinity of control rods experience severe changes in local power density as the tip of the poison section moves past them, those pins are prime candiates for interaction induced clad failure. In modern larger nuclear cores the instabilities with respect to axial xenon oscillations are expected very early in the fuel life cycle. Although this presents no operational difficulties, it does require the presence, and continued motion of, the part length rods which have been provided to control axial power distribution. This control is accomplished by positioning the longer weaker portion of the part length control rod substantially in the center of the reactor core. When a neutron flux imbalance arises at either end of the core, the part length control rod is moved in the direction of higher neutron flux to reduce the neutron flux imbalance.

Interaction as a result of part length rod motion is of concern under two separate conditions of operation. The first of these is motion of the part length rod out of a region in which they were formerly inserted, such as would occur during load follow maneuvering control or removal of the part length rod from the core. The second is the smaller motion of the part length rod required to control neutron flux imbalance or axial xenon oscillations. One benefit expected to be derived from the part length rod of the present invention is that the increase in the local power density as the part length rod is removed from the center of the core, is significantly less for the part length rod of the present invention as compared to the prior art part length rods. Removal of a previous prior art boron carbide part length rod bank is characterized by an increase in power of over 200 percent relative to the original power at the center of the rod. Removal of the part length rods of the invention results in a relative increase of in local power of only about 50 percent.

For the smaller part length rod motion necessary to control axial xenon oscillation, the relative power increase at the rod tip is larger for the stronger prior art rods (150 percent for the $B_4C$ rods versus 40 percent for the control rods of the present invention for a 5 percent motion of the part length rod).

As a result of the significant differences between the reactivity worth of the prior art part length rods and the present part length rod, an accidential drop of the new part length rod 22, 22' becomes an acceptable event as opposed to the accidental drop of a prior art part length rod which was an unacceptable event. As a result of these differences, the prior art part length rods had to be suspended from and controlled by control rod drive mechanisms which were of the non-scrammable type. This required each reactor to be outfitted with two different types of control rod drive mechanisms, one scrammable type for the regular control rods and one non-scrammable type for the part length control rods. As mentioned previously, the new part length control rods permit the use of a single type of control rod drive mechanism which is scrammable. In addition to the reduced cost necessary for outfitting the reactor with only one type of control rod drive mechanism, another advantage is to be gained from a scrammable part length rod. This second advantage is that the new part length rods are readily interchangable with regular control rods so that the positions of the part length control rods may readily be varied according to the requirements established by the management of the fuel cycle. This avoids the extreme difficulty of performing the difficult task of transposition of the drive mechanisms.

A further advantage that may be derived from the use of the new part length rod is that, due to the lower effective worth of the new part length rod the effect on power peaking from either removing the part length rod from a core that has been depleted with the part length rods in place of inserting them into a core which has not had part length rods is reduced. This reduces the impact on thermal margin so that smaller thermal margins need be maintained for the purpose of accommodating these two types of part length rod movement.

The upper portion 24 of the part length rod preferably consists of pellets of a strong poison, such as boron carbide ($B_4C$), contained within a clad or tube of Inconel. In addition the upper portion 24 preferably has a length up to 20 percent of the length of the active region of the core. By limiting the upper portion 24 to 20 percent of the active length of the core, the ability is retained to insert the part length rod 22, 22' up to 80 percent of its length for xenon power oscillation control without adversely effecting the power of the upper end of the core 12 by the insertion of the high worth poison 24. The provision of the upper portion 24 results in a part length control rod which may be scrammed upon the requirement for a rapid shutdown of the reactor. The net effect of scramming such a part length control rod is a contribution in shutdown reactivity rather than an effect which causes a decrease in net shutdown reactivity such as may have occured upon the dropping of a prior art part length control rod. Accordingly, the available shutdown margin for the entire reactor is increased by the utilization of the part length rods of the present invention.

What is claimed is:

1. A nuclear reactor comprising in combination:
   a. a reactor core having an active region containing fissionable material;
   b. a group of moveable control rods insertible into said core for controlling the power of said nuclear reactor core;
   c. moveable control means including at least one rod normally maintained partially inserted in the core for controlling asymmetrical axial power distributions, said control rod having a length substantially equal to the length of said active region of the core and having a first portion at said rod's first end containing a first neutron poison, a second portion at said rod's second end containing a second neutron poison, and a third portion whose opposite ends are adjacent to and between said first and second portions, said third portion having a small reactivity control worth relative to said first and second portions; and
   d. a plurality of scrammable control rod drive mechanisms for moveably positioning each of said control rods of said group and of said control means, said control rod drive mechanisms all being of the type which rapidly insert their associated control rods into said reactor core to their full-in positions when an emergency shut down of the reactor is desired.

2. The nuclear reactor as recited in claim 1 wherein said second neutron absorbing material has a smaller macroscopic neutron cross-section than said first neutron absorbing material.

3. The nuclear reactor as recited in claim 2 wherein said first neutron absorbing material is boron carbide ($B_4C$).

* * * * *